(12) United States Patent
Street et al.

(10) Patent No.: US 7,589,742 B2
(45) Date of Patent: Sep. 15, 2009

(54) RANDOM MAP GENERATION IN A STRATEGY VIDEO GAME

(75) Inventors: Greg Street, Redmond, WA (US); John Evanson, Redmond, WA (US); Michael Bean, Redmond, WA (US); Sergio Tacconi, Redmond, WA (US); Bryhan Hehmann, Redmond, WA (US); Brad Crow, Redmond, WA (US); Pete Parisi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 11/367,313

(22) Filed: Mar. 6, 2006

(65) Prior Publication Data

US 2007/0206023 A1  Sep. 6, 2007

(51) Int. Cl.
*G06T 15/00* (2006.01)
(52) U.S. Cl. ........................ 345/585; 345/473; 345/634; 463/16; 463/22
(58) Field of Classification Search ................. 345/585, 345/634, 473, 474, 475; 463/16, 22
See application file for complete search history.

(56) References Cited

U.S. PATENT DOCUMENTS

| | | | |
|---|---|---|---|
| 5,707,286 A * | 1/1998 | Carlson | 463/16 |
| 5,835,693 A | 11/1998 | Lynch | |
| 5,877,778 A | 3/1999 | Dow | |
| 5,995,107 A | 11/1999 | Berteig | |
| 6,210,274 B1 * | 4/2001 | Carlson | 463/16 |
| 6,636,216 B1 * | 10/2003 | Silverbrook et al. | 345/427 |
| 6,986,055 B2 * | 1/2006 | Carlson | 713/300 |
| 7,084,867 B1 * | 8/2006 | Ho et al. | 345/419 |
| 7,245,662 B2 | 7/2007 | Piche | |
| 2007/0206016 A1 | 9/2007 | Szymanski | |

OTHER PUBLICATIONS

Age of Empire III, PC Gamer Magazine, Feb. 2005, pp. 30-41 (Color).

* cited by examiner

*Primary Examiner*—Phu K Nguyen
(74) *Attorney, Agent, or Firm*—Workman Nydegger

(57) ABSTRACT

The generation of a random map for use in a video game may involve a random value generation function, with weighted texture and/or object values to control whether certain textures and/or objects are placed at certain locations on the map. Some locations may have no objects, or may have rivers or cliffs added. Additionally, equitable object placement for multiple players may be accomplished using object constraints. Closest point determination may be used for certain object types, while other objects may have constraints relaxed if initial placement efforts are unsuccessful. As a further addition, physical modeling of a humanoid form may be accomplished using a three-part model, where angles on the model drive the display of animation frames for the object.

21 Claims, 13 Drawing Sheets

RANDOM MAP GENERATION IN A STRATEGY VIDEO GAME

BACKGROUND

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Strategy-based video games, such as those in the Age of Empires™ series produced by Ensemble Studios/Microsoft Corporation, have become increasingly popular in the video game business. Such strategic games typically involve players controlling a group of units that appear on a world (or localized) map, and the games typically involve one player's units battling a group of units belonging to another player (a human opponent, computer-controlled opponent, or any combination of the two). In addition to decisions in combat, such games may involve tactical decisions regarding the creation and/or improvement of units, as well as resource gathering to acquire components needed to create/improve units.

Much of the strategy behind winning such games involves exploring a map to discover the locations of map features (e.g., terrain, resources, etc.), and exploiting that knowledge. Identifying, locating, and protecting map resources becomes every bit as important as effectively controlling units in combat. Accordingly, advance knowledge of a map's details, such as the locations of key resources, can give an advantage to the player with the knowledge. If only one player has prior knowledge of the map, such an unfair advantage takes away from the enjoyment of the game, and for this reason, it is desirable to include a random map feature with such games.

A random map feature may keep the player guessing as to where things are in the world, and may keep the game fresh for the player. However, effectively and quickly generating realistic random maps that will be fair and fun to play is a difficult endeavor.

Another feature of strategy games involves animation. Animating the movement of onscreen images, such as characters, helps provide a more engaging game experience. However, realistically animating characters requires computing resources during the game's execution, and if a large number of characters are to be animated onscreen, the required computing resources may become a bottleneck for the program, and the user may experience lagging and/or stalling.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A map may be randomly generated by assigning weight values to a number of different elements that may appear on the map, and using a random value function and said weights to determine which elements actually appear at which locations on the map. For example, the map may be made up of tiles, the various elements may each be given a weight value, and the random value function may generate a value for each tile. Comparing that value to the weights may result in the selection of one of the elements for appearance in the current tile.

The various elements can be terrain textures, object models, or any other type of desired element, or combinations of them. Weighted values may be used for terrain textures as well as object models. In some situations, it may be possible to have tiles that do not have any objects, and the weight values may be assigned to cause this result. When object models are placed, they also may be randomly rotated to further create unique maps.

The maps may be generated using a file containing parameters for the random value function, and containing different textures and/or models for use in the particular type of map being generated. The file may also include the random function itself, which may be a Perlin noise function.

Some objects may also be rivers, which can be added as splines, or cliffs, which may be added using predefined and interchangeable meshes. If meshes are used, vertices in the meshes may be adjusted to have their elevations correspond to elevations of the area in which the cliff is added. Indeed, random map elevations may be added across the map.

The various map generation parameters may be scaled based on the number of players, to help make a fair map.

Objects may be distributed across the map based on individual object constraints. Proposed locations for the objects may be compared with the constraints, and upon failure, additional locations may be proposed based on the first proposed locations. For certain objects, such as higher priority objects, the constraints may be relaxed if initial efforts are unsuccessful in finding acceptable locations.

Additionally, a physical modeling technique may use a three-piece physical model to simulate physical interaction. Animation frames may be associated with angles formed by the model, and display of the frames may be driven by the angles in the simulation.

The three-piece model may have hinge constraints with a central body, and may include two spheres (or other shapes) connected to the body. A sequence of animation frames may be associated with a sequence of angles, and stored as a mapping in a memory. During a physical simulation, the modeled body may bend, and an angle may be formed by one or more of the objects. This angle (which may be a bending or twisting angle) may be measured, and compared to the mapping to determine which animation frame to display for the model's current angle.

Multiple animation frames may be associated with a given angle, such that while the body remains at that angle, the multiple frames may be displayed. The multiple frames may be displayed according to a stored time sequence or predetermined rate.

These and other aspects will be described in greater detail below.

BRIEF DESCRIPTION OF THE DRAWINGS

FIG. 8a illustrates an example displacement map that may be used to modify cliffs, while

DETAILED DESCRIPTION

In the following description of the various aspects, reference is made to the accompanying drawings, which form a part hereof, and in which is shown by way of illustration various features described herein may be practiced. It is to be understood that other embodiments may be used and structural and functional modifications may be made.

Figure 1:
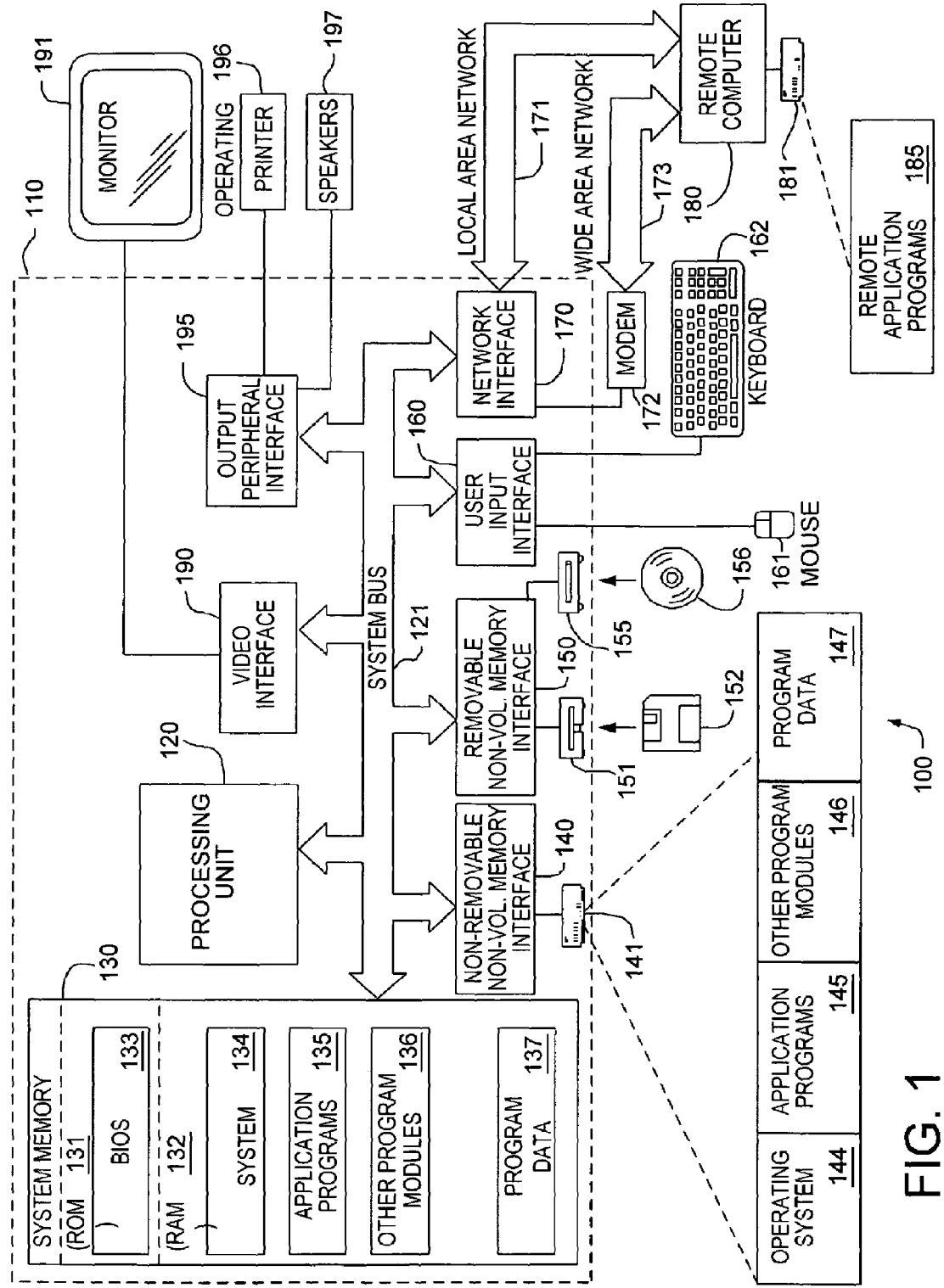
FIG. 1 illustrates an example of a computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non removable, volatile/nonvolatile computer storage media. By way of example only, FIG. 1 illustrates a hard disk drive 141 that reads from or writes to non removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
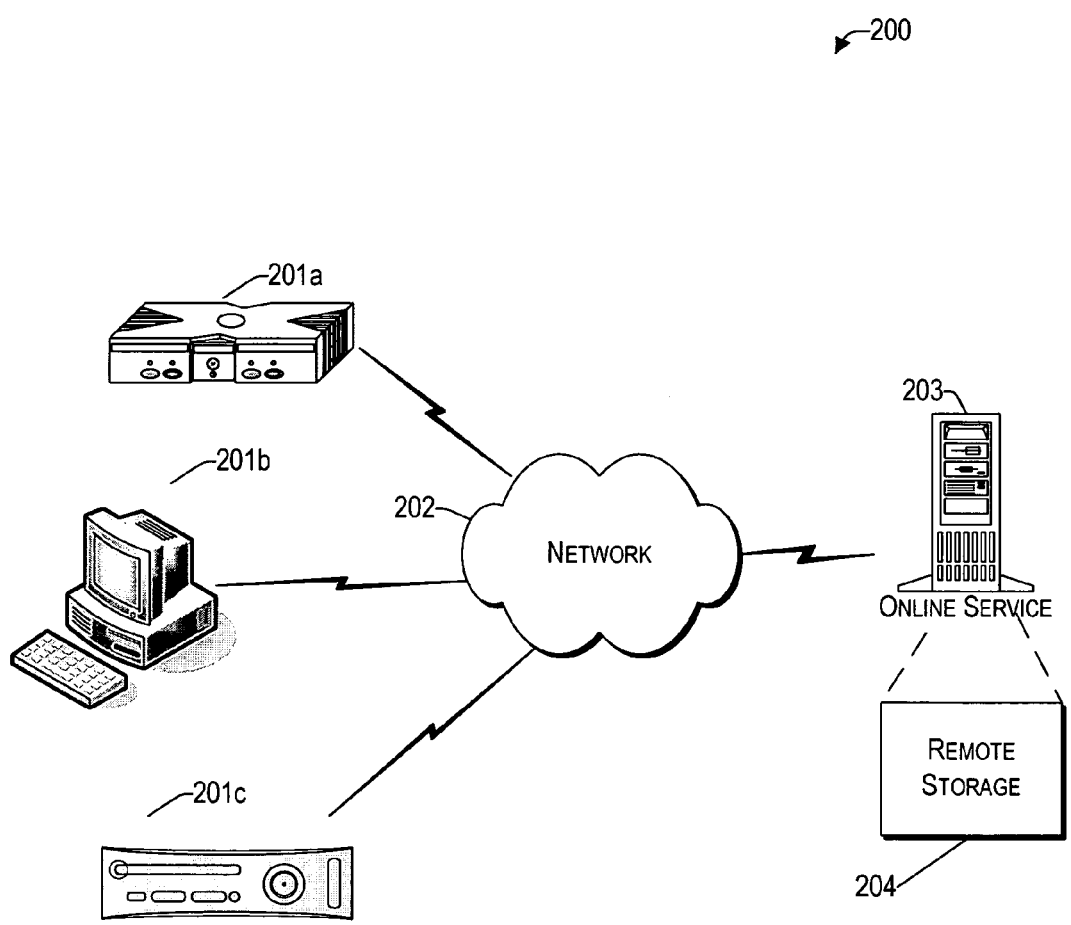
FIG. 2 illustrates an example networked configuration.

FIG. 2 shows an example network gaming environment 200 that interconnects multiple gaming systems 201*a-c* via a network 202. The various gaming systems 201 may be computing devices as shown in FIG. 1, and may be dedicated gaming consoles 201*a,c*, personal computers 201*b*, or a combination thereof. The network 202 represents any of a wide variety of data communications networks. It may include public portions (e.g., the Internet) as well as private portions (e.g., a residential Local Area Network (LAN)), as well as combinations of public and private portions. Network 202 may be implemented using any one or more of a wide variety of conventional communications media including both wired and wireless media. Any of a wide variety of communications protocols can be used to communicate data via network 202, including both public and proprietary protocols.

Examples of such protocols include TCP/IP, IPX/SPX, NetBEUI, etc.

In addition to gaming systems 201*a-c*, one or more online services 203 may be accessible via the network 202 to provide various services for the participants, such as hosting online games, serving downloadable music or video files, hosting gaming competitions, serving streaming audio/video files, and the like. The network gaming environment 200 may introduce another memory source available to individual gaming systems 201*a-c*—online storage. In addition to the storage media shown, for example, in FIG. 1, the gaming systems 201*a-c* can also access data files available at remote storage locations via the network 202, as exemplified by remote storage 204 at online service 203.

Features described herein may be used for a variety of strategy game types. One such game type, known as a real-time strategy (RTS) game, involves players giving instructions to various onscreen characters (e.g., citizens in the player's civilization) to do certain tasks (e.g., move from one place to another, collect wood from a forest, mine a mineral, harvest food from a farm, etc.), which those characters then perform in real time. The various tasks are accomplished at a predetermined rate. For example, a character instructed to collect wood from a nearby forest may move at a predetermined rate (e.g., a walking pace of 2 miles per hour, in game map units) to walk to the forest, and then may collect the wood at a predetermined rate (e.g., harvesting one unit of wood every 3 seconds of game time). The various rates may be predetermined as default game settings, and may also vary depending on various in-game characteristics. For example, players may be given the choice to play as certain civilizations or nations, and different nations may have different rates of accomplishing different tasks (e.g., the villagers of one nation may collect wood at a faster rate, while another nation's villagers may move at a faster rate). The rates may also change based on in-game events or accomplishments by the player. For example, the player may acquire an advance in farming technology in the game (e.g., by building a certain building type, or devoting villager time to researching technology), after which the player's villagers may collect food at a faster rate than before (e.g., collecting a unit of food every 2 seconds, as opposed to every 3 seconds).

The strategic aspect of RTS games comes when one player competes against another human or computer-controller player. For example, two players may each start at different parts of a map (and may be unable to view the entire map, and unaware of the specific location of the other player), and may each begin the game with a given set of resources (e.g., number of characters to control, number of buildings, etc.), and a given victory condition (e.g., destroying all of the other player's units). Once the game begins, each player then controls his or her characters to try and meet the victory condition, and will likely attempt to do so with different strategies. For example, one player might try to build a large army of relatively weak units as quickly as possible (e.g., by having her initial characters devote their effort to maximizing population growth by building houses and collecting food), while the other player might devote efforts to acquiring new technologies to allow for stronger and more effective units later in the game (by, for example, instructing some of his characters to devote time to researching those technologies, instead of building houses or collecting food).

Figure 3A:
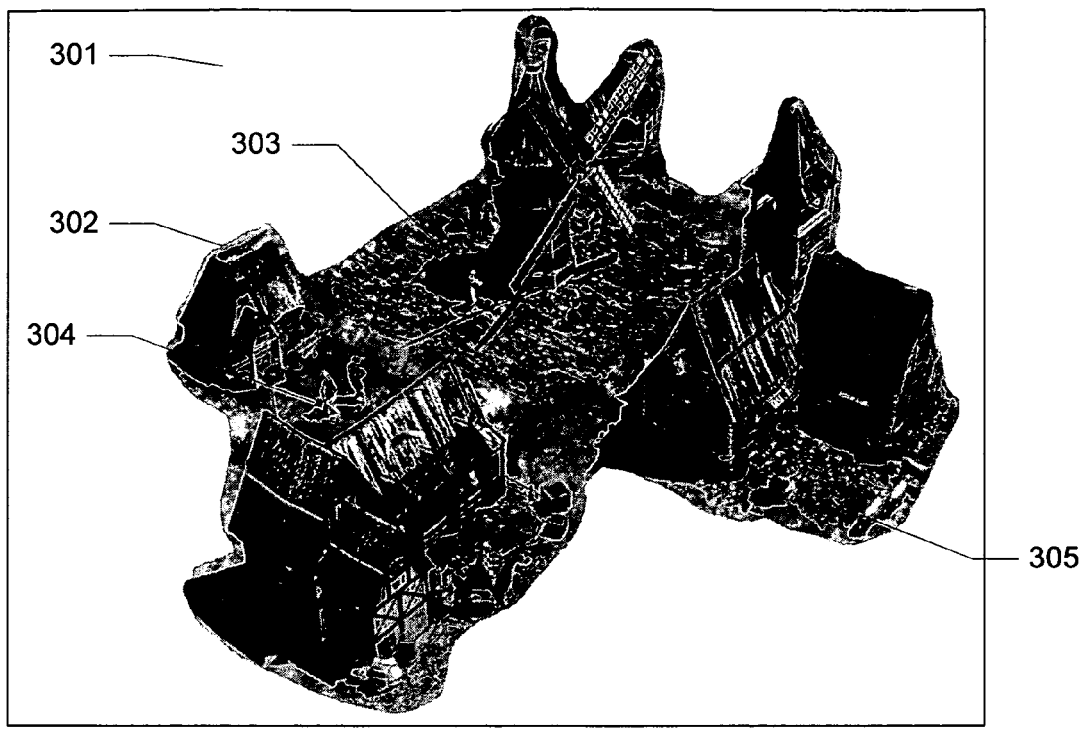
FIGS. 3a-b illustrate example maps and related items on the maps.
Figure 3B:
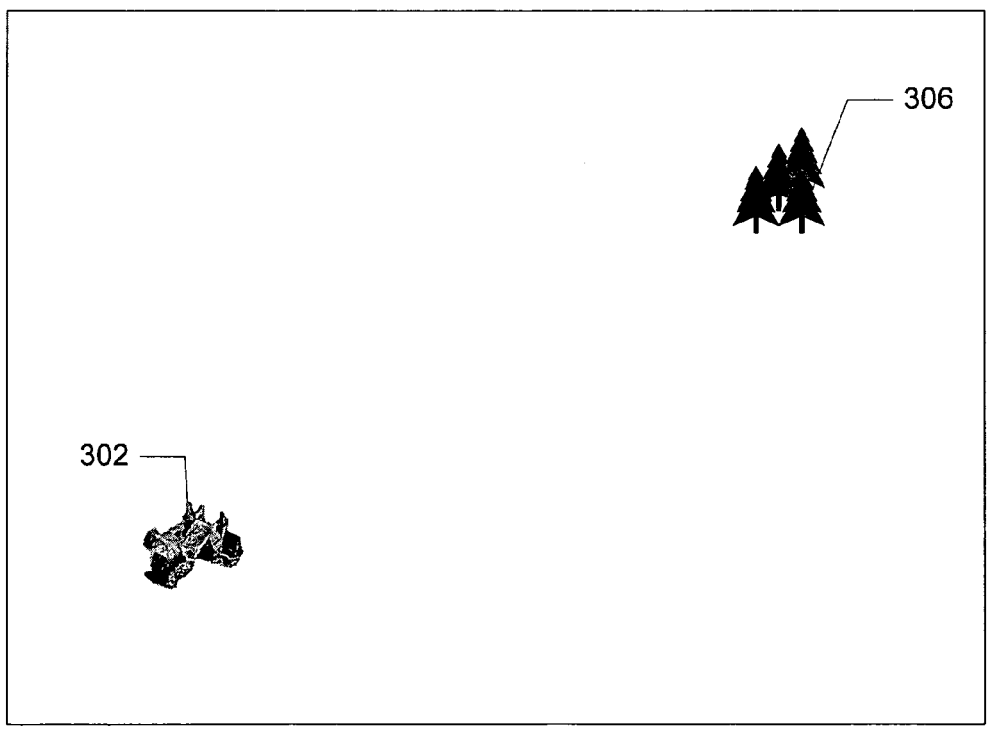

FIG. 3*a* illustrates an example map 301 in which such a strategy game may be played. The map may include a number of structures, such as houses 302 and farms 303, and may also include a number of animated characters, such as persons 304 and animals 305. The various structures and characters may each serve individual purposes for the player. Farms 303 may supply food, food may be needed to "create" people 304 in the game, and people 304 may be needed to gather wood and other resources to construct houses 302, armories, mills, etc., or to build weapons and equipment. The map may appear at different scales, and FIG. 3*b* illustrates a zoomed-out view of the view from FIG. 3*a*, with additional features located elsewhere on the map, such as forest 306.

Any type of resource may be available in the map. For example, wood, mineral resources (e.g., gold, silver, metal ore, oil, stone, etc.) and wildlife (e.g., deer, sheep, fish, etc.) may be available. Natural features, such as mountains, lakes, rivers, oceans, deserts, grasslands forest, plains, cliffs, etc., may also exist. Resources need not always be natural, either. For example, some resources may exist in the form of computer-controlled characters that can be persuaded to join a player's team if certain conditions are met (e.g., establishing a trading post near a neutral Native American tribe's city may cause the tribe to ally with the builder, or current owner, of the trading post). Additional details on example resources are addressed further below.

Figure 4A:
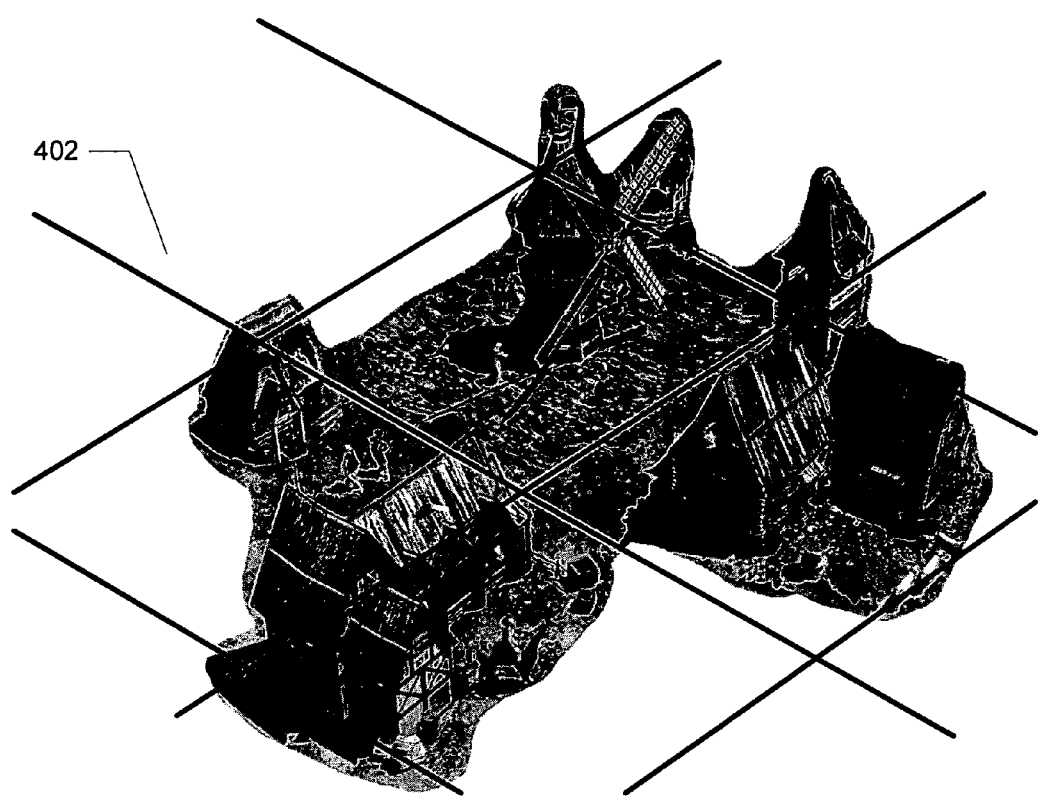
FIGS. 4a-b illustrate example grids and tiles that may be used to create maps.
Figure 4B:
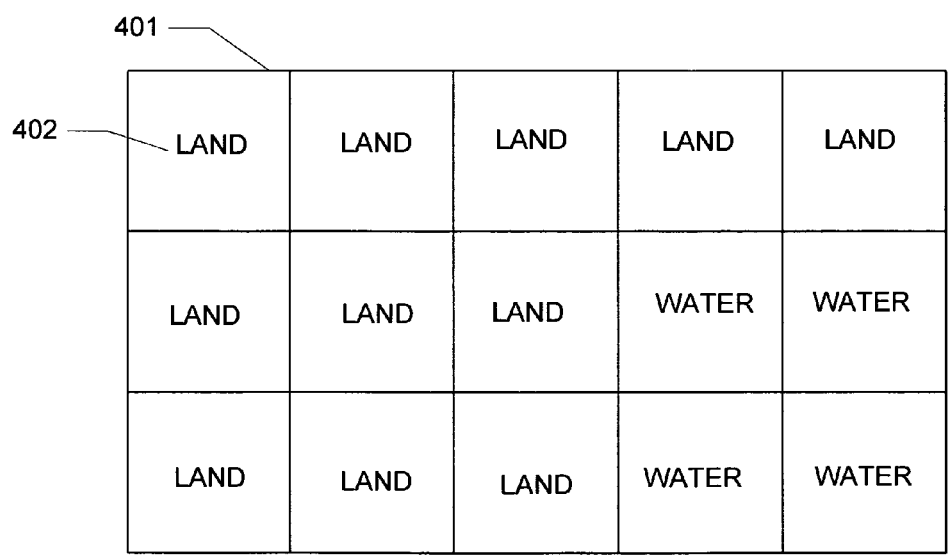

The map may be defined as a grid of space. FIG. 4*a* shows the view from FIG. 3*a* with a superimposed grid 401 in isometric view, while FIG. 4*b* shows the grid 401 from an overhead view. In grid 401, the available map area may be divided into a plurality of tiles 402, where each tile 402 serves as an elementary unit for creating the map. The various tiles 402 may be processed individually to generate unique appearances for each (e.g., the type of terrain, elevation, amount of resources or objects, etc.). Although the tiles are shown as square in FIG. 4, other shapes of tile may be used as well (e.g., hexagons, triangles, etc.).

Much of the strategy behind a strategy game may involve knowledge of a map and using its features to the player's advantage. Seasoned players who play on the same map over and over again may get to know a game's map(s) so well that it no longer becomes a challenge, so it may be desirable to randomly generate new maps to keep the game fresh. The random maps may be generated using computer programs, which may be in script form, that use randomizing functions to assemble new maps. The scripts may be written in advance by a game developer before the game's release, and may also be written by fans after the release. Multiple scripts may be written to generate different types of random maps. For example, there may be one script to generate maps that have a lot of water features, and another script may be written to generate maps that occur primarily in desert terrains. Different scripts may also define parameters that guide the distribution of objects and features around the map, such as players, rivers, trees, lakes, wildlife, player resources, etc. Example uses of such parameters are described below, in connection with the FIG. 8 example method for generating a random map.

The developer may create a wide selection of scripts, using different variable values described below, to allow the player to select the general type of random map to be created. For example, one script may be created for a random map in a mountainous region, and the relevant parameters for the generation below may be predetermined to result in such a map (e.g., higher weights may be given to mountain terrain textures, default elevations may be increased, etc.). The use of these parameters and the generation of the map will be discussed below.

In step 501, the process may begin by defining the general parameters for the random map to be generated. This may be accomplished, for example, by prompting the user at the beginning of a game to provide parameters for the upcoming random map and game. For example, the user hosting or creating the game may choose the number of players that will play, and designate whether each player is a human-controlled opponent or a computer-controlled opponent. If computer-controlled, the user may also establish a difficulty level that may serve as a handicapping device to govern the computer-controlled opponent's efficiency and effectiveness in playing the game. The user may also be prompted to identify other characteristics of the game, such as the general map type (e.g., a predominantly ice and snow map, a desert map, a predominantly water map with islands, etc.), victory conditions (e.g., win by annihilating all opponents, win by controlling a majority of predetermined neutral locations on the map, etc.), resource allocation (e.g., type and/or amount of resources to be available on the map), type of units usable in the game (e.g., games set in different time periods, such as pre-colonial times in North America, colonial time, post-revolutionary America, etc., may have different types of units available depending on the time period), etc. These parameters may be dynamically entered by the user individually, or they may be generated in advance and offered to the user as a selectable set of parameters. For example, game developers or other users may create predefined scripts of game setups, such as a "Random Map of Texas in the Colonial Age" script that automatically sets the land masses to mostly desert with colonial-style technologies available. Furthermore, the various parameters for the game and map may be automatically scaled based on the number of players. So, for example, the script for a particular random map scenario may specify, for example, that there are at least three mineral mine resources on the map for every player in the game.

When the user selects the general map type, the system may then begin to generate the map by considering the general terrain type for that map type, and the type of land and water distribution to be used. For example, some maps may involve a large body of land surrounded by water just at the edges, while other maps may include a predetermined amount of water features (e.g., lakes, rivers, oceans) interspersed with the land. Yet other maps may be island-based maps, where the majority of the map is water, with individual islands of land to be sprinkled in the water. This may be accomplished, for example, using a numerical ratio of land to water as a parameter in a script that the user may select. For example, a user may choose to play an "island" map, and in response to that user selection, the game may choose a script in which the numerical ratio identifies a large amount of water in relation to land. Or, the game may set data values for land and water to have a higher ratio of water to land. When the land and water composition is known, the game program may then generate an initial grid, such as grid 401, having the required land/water makeup. Alternatively, different scripts may expressly define the distribution of land and water across the grid.

With the initial grid ready, the game may then proceed to step 502 and add random noise elevations to the map. The real world is rarely perfectly flat, so the addition of random changes in elevation (increasing and/or decreasing) throughout the grid 401 may help present a more realistic view. The elevation can be randomly distributed, for example, using a two-dimensional Perlin noise function and its attendant input values, such as the frequency, persistence, and number of octaves to apply. The results of the noise function may then be applied across the various tiles of the map, resulting in a randomized elevation value for each tile, which may be used to adjust a height value for that tile. For example, the randomized elevation value may be arithmetically applied (e.g., multiplied, divided, added, subtracted, etc.) to a predetermined elevation adjustment value (e.g., +10 feet, −20 feet, etc.) to adjust the elevation of tiles across the map. If desired, constraints are placed on the function to ensure that there are no major discontinuities in the elevation distribution. These constraints may further smooth any discontinuities that remain from the Perlin function. As an example, smoothing operations may be performed at the edge vertices of tiles, where color values, heights, etc. may be averaged to smooth out the appearance. The following is an example of function header file and code that may be used:

```
//===============================================================
// noise.h
// Copyright (c) 2003, Ensemble Studios
//===============================================================
#pragma once
#ifndef __NOISE_H__
#define __NOISE_H__
//===============================================================
static const DWORD cNoiseTableSize = 256;
static const DWORD cNoiseTableMask = cNoiseTableSize-1;
//===============================================================
// class BNoise
//===============================================================
class BNoise
{
   public:
               BNoise(long seed);
        float  gradientNoise(float x, float y, float z);
```

```
    float    turbulence(float x, float y, float z, float minFrequency, long octaves, float
persistence);
    float    fractalSum(float x, float y, float z, float minFrequency, long octaves,
float persistence);
  protected:
    __forceinline BYTE    getPermutation(long x) const
{return(mPermutationTable[x&cNoiseTableMask]);}
    __forceinline BYTE    getIndex(long x, long y, long z) const {return(getPermutation(x +
getPermutation(y) +getPermutation(z)));}
    __forceinline float   smoothStep(float t) const {return(6.0f*t*t*t*t*t − 15.0f*t*t*t*t +
10.0f*t*t*t);}
    __forceinline float   lerp(float t, float x0, float x1) const {return(x0+t*(x1−x0));}
    float    gradientLattice(long ix, long iy, long iz, float fx, float fy, float fz) const;
    BYTE     mPermutationTable[cNoiseTableSize];
};
extern BNoise gNoise;
#endif
//================================================================
// eof: noise.h
//================================================================
//================================================================
// noise.cpp
// Copyright (c) 2003, Ensemble Studios
//================================================================
#include "ecore.h"
#include "noise.h"
//================================================================
// global instance for convenience
//================================================================
BNoise gNoise(23465);
//================================================================
// Canonical gradient table
//================================================================
const BVector gGradientTable[16] =
  {
    // These are the real 12 we need.
    BVector(1.0f,1.0f,0.0f),
    BVector(−1.0f,1.0f,0.0f),
    BVector(1.0f,−1.0f,0.0f),
    BVector(−1.0f,−1.0f,0.0f),
    BVector(1.0f,0.0f,1.0f),
    BVector(−1.0f,0.0f,1.0f),
    BVector(1.0f,0.0f,−1.0f),
    BVector(−1.0f,0.0f,−1.0f),
    BVector(0.0f,1.0f,1.0f),
    BVector(0.0f,−1.0f,1.0f),
    BVector(0.0f,1.0f,−1.0f),
    BVector(0.0f,−1.0f,−1.0f),
    // These are duplicates for padding out to an even power of two table size to allow & 16
instead of % 12
    BVector(1.0f,1.0f,0.0f),
    BVector(−1.0f,1.0f,0.0f),
    BVector(0.0f,−1.0f,1.0f),
    BVector(0.0f,−1.0f,−1.0f)
  };
//================================================================
// BNoise::BNoise
//================================================================
BNoise::BNoise(long seed)
{
  BRandom3 rnd;
  rnd.setSeed(seed);
  // Build random permutation table.
  // First, fill it in order.
  for(long i=0; i<cNoiseTableSize; i++)
    mPermutationTable[i] = (BYTE)i;
  // Now shuffle.
  for(long i=0; i<cNoiseTableSize; i++)
    {
      // Pick a random spot between here and the end of the array.
      long swapIndex = i + (rnd.getRandom( ) % (cNoiseTableSize−i));
```

-continued

```
      // Swap.
      bswap(mPermutationTable[i], mPermutationTable[swapIndex]);
   }
}
//================================================================
// BNoise::gradientNoise
//================================================================
float BNoise::gradientNoise(float x, float y, float z)
{
   // X components
   long ix = long(floor(x));
   float fx0 = x - ix;
   float fx1 = fx0 - 1;
   float wx = smoothStep(fx0);
   // Y components
   long iy = long(floor(y));
   float fy0 = y - iy;
   float fy1 = fy0 - 1;
   float wy = smoothStep(fy0);
   // Z components
   long iz = long(floor(z));
   float fz0 = z - iz;
   float fz1 = fz0 - 1;
   float wz = smoothStep(fz0);
   // Trilinearly interpolate the eight neighbors.
   float vx0 = gradientLattice(ix, iy, iz, fr0, fy0, fz0);
   float vx1 = gradientLattice(ix+1, iy, iz, fx1, fy0, fz0);
   float vy0 = lerp(wx, vx0, vx1);
   vx0 = gradientLattice(ix, iy+1, iz, fr0, fy1, fz0);
   vx1 = gradientLattice(ix+1, iy+1, iz, fx1, fy1, fz0);
   float vy1 = lerp(wx, vx0, vx1);
   float vz0 = lerp(wy, vy0, vy1);
   vx0 = gradientLattice(ix, iy, iz+1, fx0, fy0, fz1);
   vx1 = gradientLattice(ix+1, iy, iz+1, fx1, fy0, fz1);
   vy0 = lerp(wx, vx0, vx1);
   vx0 = gradientLattice(ix, iy+i, iz+1, fx0, fy1, fz1);
   vx1 = gradientLattice(ix+1, iy+1, iz+1, fx1, fy1, fz1);
   vy1 = lerp(wx, vx0, vx1);
   float vz1 = lerp(wy, vy0, vy1);
   float result = lerp(wz, vz0, vz1);
   return(result);
}
//================================================================
// BNoise::gradientLattice
//================================================================
float BNoise::gradientLattice(long ix, long iy, long iz, float fx, float fy, float fz) const
{
   // Get gradient vector.
   const BVector &gradient = gGradientTable[getIndex(ix, iy, iz)&0xF];
   // Dot with fractional portion to get result.
   return(gradient.x*fx + gradient.y*fy + gradient.z*fz);
}
//================================================================
// BNoise::fractalSum
//================================================================
float BNoise::fractalSum(float x, float y, float z, float minFrequency, long octaves, float persistence)
{
   // Add octaves.
   float noise = 0.0f;
   float freq = minFrequency;
   float amp = 1.0f;
   for(long i=0; i<octaves; i++)
   {
      noise += amp * gradientNoise(freq*x, freq*y, freq*z);
      freq *= 2.0f;
      amp *= persistence;
   }
   if(noise < -1.0f)
      noise = -1.0f;
   if(noise > 1.0f)
      noise = 1.0f;
   return(noise);
}
//================================================================
// BNoise::turbulence
//================================================================
float BNoise::turbulence(float x, float y, float z, float minFrequency, long octaves, float persistence)
```

-continued

```
{
  // Add octaves.
  float noise = 0.0f;
  float freq = minFrequency;
  float amp = 1.0f;
  for(long i=0; i<octaves; i++)
  {
    noise += amp * float(fabs(gradientNoise(freq*x, freq*y, freq*z)));
    freq *= 2.0f;
    amp *= persistence;
  }
  if(noise > 1.0f)
    noise = 1.0f;
  // Bring from 0 to 1 range into –1 to 1 range.
  noise = 2.0f*noise – 1.0f;
  return(noise);
}
//================================================================
// eof: noise.cpp
//================================================================
```

Not only is Mother Nature rarely perfectly flat, the textures appearing in a surface area (land or water) are rarely uniform in appearance. A snowy area may have patches of grass peeking through, or different shades of ice and snow scattered throughout. A grassy area may have different types and/or colors of grass, and bald areas, scattered throughout. Larger objects, such as rocks, bushes, trees, etc. may also be scattered about the area. To replicate these textures and background objects, another .two-dimensional Perlin noise function may be used to create appropriately random mixes of terrain textures and objects. In step 503, a terrain mix data file may be obtained (e.g., selected and loaded) and applied to create the random terrain for the map being generated. The mix file may be selected based on the parameters defined in step 501 (e.g., separate mix files for different game types), and may identify the noise function as well as the parameters used in the function. So, for example, the mix file may identify the function, the number of octaves, the summing method (e.g., the "turbulence" or "fractal sum" methods), the frequency, and the persistence value to be used for the terrain textures in the current map. A separate function and associated values may be established for the placement of larger objects.

The mix file may also identify the various textures and background objects that are available to be used in the map. A texture may be a simple color or pattern, or it may be an artist-created image of a texture (e.g., a bitmap of a sandy patch of beach). Larger objects may also be represented using images, as with textures, although larger objects may alternatively be three-dimensional models (e.g., a model of a rock, bush, tree, etc.) that may appear in the map. The mix file may also include a weight value that identifies how frequently each texture and object should appear in the map. The text below is an example of a mix file identifying textures and background objects:

```
<mix>
    <icon>terrain\mix\jimmy</icon>
    <paint mode='turbulence' freq='0.1' octaves='6'
    persistence='0.58'>
        <texture weight='6'>yukon\ground1_yuk</texture>
        <texture weight='5'>yukon\ground2_yuk</texture>
    </paint>
    <objects mode='turbulence' freq='0.75' octaves='3'
persistence='0.6' emptyweight='90' posOffset='0.5'>
        <model
```

-continued

```
        weight='4'>terrain\underbrush\underbrush_snow_grass1</model>
        <model
        weight='4'>terrain\underbrush\underbrush_snow_grass2</model>
        <model
        weight='5'>terrain\underbrush\underbrush_snow_bush2</model>
        <model
        weight='5'>terrain\underbrush\underbrush_snow_bush3</model>
        <model
        weight='3'>terrain\underbrush\underbrush_snow_rock1</model>
        <model
        weight='3'>terrain\underbrush\underbrush_snow_rock2</model>
    </objects>
</mix>
```

In that example, the Perlin turbulence, frequency, octaves and persistence are identified separately for distribution of terrains and background object models, and separate functions may be used for the two. For example, two textures ("ground1_yuk" and "ground2_yuk") are listed. The textures may refer to, for example, two predefined images showing two different types of grass. In this example, the weight values for these textures are 6 and 5, respectively. The example also lists six background object models (two types of modeled grass, two types of modeled bushes, and two types of modeled rocks), with their respective weights. Alternatively, the same function may be used for terrain and object placement, with different parameters.

While it may be desirable for every tile to have a texture, it is not necessary for every tile to have an object, so the function, scaling and/or normalization may cause some tiles to have weights that are not satisfied by any of the-listed models. In the example above, the "emptyweight" value is given as 90, which, when applied to the noise function, causes a certain portion of the tiles to have weight values that are not satisfied by any of the listed models.

Additionally, when placing background objects in a tile, the object's location and orientation within the tile may be adjusted by the noise function. For example, the particular noise function used for placing objects may generate a random distance and/or offset value for this placement. The mix file may include a maximum offset value for each object to ensure that certain objects are not too close to the edge of a tile. For example, it might make sense to keep larger rocks closer to the center of a tile, so that the rock's shadow need not appear in a neighboring tile. The maximum distance may be measured from any predetermined point in the tile, such as its center, its bottom-left edge, etc. The orientation of the object may also be changed, with the object being rotated by a random amount, such that when the object is placed in different tiles, the object may be rotated by different amounts in each tile.

When the terrain and background object mix is applied in step 503, each noise function may generate a random value for each tile. From the terrain function, the value may be scaled by the total weight of all textures (or background objects) in the map to normalize the values, and then the list of textures in the mix file may be searched to find a texture satisfying the weight value for each tile. For example, the list may be searched to find the first listed texture whose weight value falls under the normalized weight value of that tile, and that texture may be used in that tile. Other weighting techniques may also be used. As an example, the various textures may be assigned a weight value that is the sum of previous weight values, such that each item has a distinct weight value, and the weight values may be sorted in increasing order and searched from last value to first value.

Similarly, the background object noise function may also generate a value for each tile, and the object weights may be searched to find an object model (if any) satisfying the weight value. Although separate functions are described above, a single function may be used for both purposes, for example, by using different portions of a single random number generated by the function.

After the terrain and background object mix has been established, the game may proceed to step 504, in which player areas may be defined to begin distributing the other, player-interactive objects on the map. Many strategy games involve a "fog of war," where unexplored portions of the map are blacked-out and invisible to the player until he or she, through one of his or her characters, explores that region of the map. This creates an exploration aspect for the game, but if some players are initially surrounded by a wealth of resources while others are not, the random map may create an unbalanced game from the start. To help keep the random map games balanced, the map may be generated with an eye towards placing interactive objects (as opposed to background objects, which might just contribute to overall appearance) on the map so that players have an equal chance at discovering them. In step 504, the overall map may be divided into a number of areas, so that each player starts in a separate area of the map, and has their own area in which such objects can be found.

Determining the player area may involve first considering the overall size of the map, and assigning each player a fraction of that size. The fraction may simply be an equal part of the map area (e.g., a map of 240 tiles for 4 players may simply assign each player 60 tiles), or it may be a portion thereof (e.g., with portions of the map left unassigned, or neutral). The fraction, and other parameters described below, may be found in the parameters defined in step 501.

Constraints may be applied to this process to further enhance fairness. For example, undesired or unusable areas (e.g., impassable mountains, water features, etc.) may be omitted from the total of available tiles, and consequently may be ignored in the assignment of player areas. Another constraint may require that the player areas each be contiguous "blobs" of tiles (i.e., any tile in the blob is reachable from any other tile in the blob either directly or by crossing over one or more neighboring tiles). Such a contiguous area may be grown using an iterative process that evaluates neighboring tiles in view of coherence and constraints (e.g., whether neighboring tiles are close enough in elevation, type, object content, overall distance from original tile of player area, etc.), and adds them if these criteria are satisfied. Another constraint may specify a minimum distance that must, or maximum distance that may, exist between player areas (e.g., if areas are defined such that they do not border one another). Other constraints include restricting placement to a predetermined shape, such as a rectangle, pie wedge portion of a circle, etc., distances (minimum or maximum) from other objects or object classes, distances from an edge of the map, map features such as cliffs and rivers, terrain types, etc.

Once the player areas are established, the process may then proceed with distributing the various objects throughout the areas. Some objects may be player-specific, in that they are placed somewhere within each player's area, while other objects may be neutral, and may be placed between player areas or at a predetermined minimum distance away from each area (or from a predefined point, such as a central point, of each area). Objects may be of any type. For example, objects may be resources (e.g., forest, mineral, animal, the player's starting home base, etc.), player characters (e.g., a player's villagers), neutral characters, etc. In step 505, a loop may begin for each player's area to place objects for each player. For example, in addition to giving the user an option to select a basic type of map on which to play (e.g., islands, desert, etc.), the user may also be given the option of selecting the types and/or amounts of resources to be available on the map. The distribution of these objects may be done equally for each player, so in step 505, a looping process may begin for each player area. If neutral objects are to be placed on the map, the neutral objects may be counted as a player for purposes of the step 505 looping, such that those neutral objects get placed as well.

In step 506, another looping process may begin for each object to be placed. The overall list of objects to be placed may be defined in the script, which may be chosen at the same time the user selects the basic type of map on which to play, and may also be defined based on the parameters defined in step 501. The actual composition of objects may depend on the type of game the user has requested. For example, the user may be given the option of choosing to play on a "resource rich" map, in which case a large number of objects may be provided for each player area.

In step 507, various placement parameters for the different objects may be defined by, for example, loading a predefined script or obtaining user preferences that may have been identified in step 501. For example, each object may have minimum and maximum distance parameters that specify permitted distances an object may have from a point (such as a center point or origin point) of the corresponding player's area. For example, if one player's main area was set to be at position 100,200 on the map, a resource object (e.g., wildlife for food, mine for minerals, etc.) may have distance parameters specifying a minimum and/or maximum distance to be kept from that point. Another parameter includes defining the types of other objects that are to be avoided by the present object. For example, the placement of a town center object may be given a parameter to avoid (or maintain a predetermined distance from) another town center, bodies of water, impassable terrain, or any other terrain features or objects that may also be placed on the map. The parameters may also include an indication that certain types of objects are to be kept nearby, or within a predetermined distance.

With the parameters defined, the process may move to step 508, where a proposed location is generated for the object being placed. The proposed location may be generated by predetermined values in the script. For example, the script may associate each object with a predetermined default location within a player's area, such as an offset from an origin point of the area. Alternatively, the script may associate an object's location based on the locations of other, previously placed objects. For example, the script may initially propose that a source of silver be located 10 units to the east of the last object placed, the town center, the last resource object placed, etc.

In step 509, the proposed location for the current object is compared with the various parameters defined in step 507. If the parameters are satisfied at the new location, the process may place the object at that location, and return to step 506 for the next object in the area. If no more objects remain to be placed in the current area, the process may return to step 505 to consider the next area (if any), and if no more areas remain, the process may complete, and the random map may be ready for play.

Note that as more and more objects get placed in the area, there will be more and more potential obstacles to contend with for future objects. Accordingly, it may be desirable to sort the objects for purposes of placement in a priority order, such that higher priority objects get placed before lower priority objects. The priorities may vary depending on the particular game. For example, in an RTS in which each player starts with a town center as a base of operations, the placement of the town center may be the highest priority, and may be placed first.

At step 509, if the proposed location violates a parameter, the process may move to step 510, where a check may be made to determine whether the current object is a critical object. A critical object may be an object that is important to have on the map, such as a key resource, or base of operations, etc. The script for the map, or a parameter from step 501, may flag certain objects as critical objects. Alternatively, objects having a priority value exceeding a predetermined threshold may be automatically determined to be critical. If the object is a critical one, the process may move to step 511 and check to see if too many failures have occurred in placing the current object. The system may maintain a data value counting the number of failed attempts for the current object, and the script may identify a maximum number of placement attempts that should be tried for the current object. If the number of tries has not yet met or exceeded the maximum, the process may increase the running failure count by one and then return to step 508 to select another proposed location. However, if the maximum number of tries has been reached, the process may move to step 512 and relax one or more parameters for the placement of this critical object. With the relaxed parameter(s), the process may return to step 508 to propose a new location. The relaxation of the parameters may be predetermined in the script as well. For example, the script may provide a plurality of relaxed versions of an object's parameters, and the relaxed versions may be sorted in the script. The script may, for example, use an initial minimum distance value of 100, and a relaxed value of 80. Additional relaxed values (e.g., 75, 70, etc.) may also be provided.

If, in step 510, it is determined that the failed object is not a critical object, the process may move to step 513, where a closest point determination may be made to identify the nearest point to the proposed location that satisfies the various parameters and constraints. In this process, neighboring tiles may be checked in a spiral pattern to find the nearest satisfactory tile, and the object may be placed at that tile. Alternatively, a randomization function may be used to randomly attempt neighboring tiles. In this step, if the nearest point cannot be found within a predetermined distance, such as a set number of tiles specified in the script, this object may simply be ignored and not placed on the map. The process may then return to step 506 to consider whether more objects need to be placed in the area. If no more objects remain for the current area, the process may return to step 505 to check the next area, and if all areas have been addressed, the process may conclude with the random map ready to play.

Figure 5:
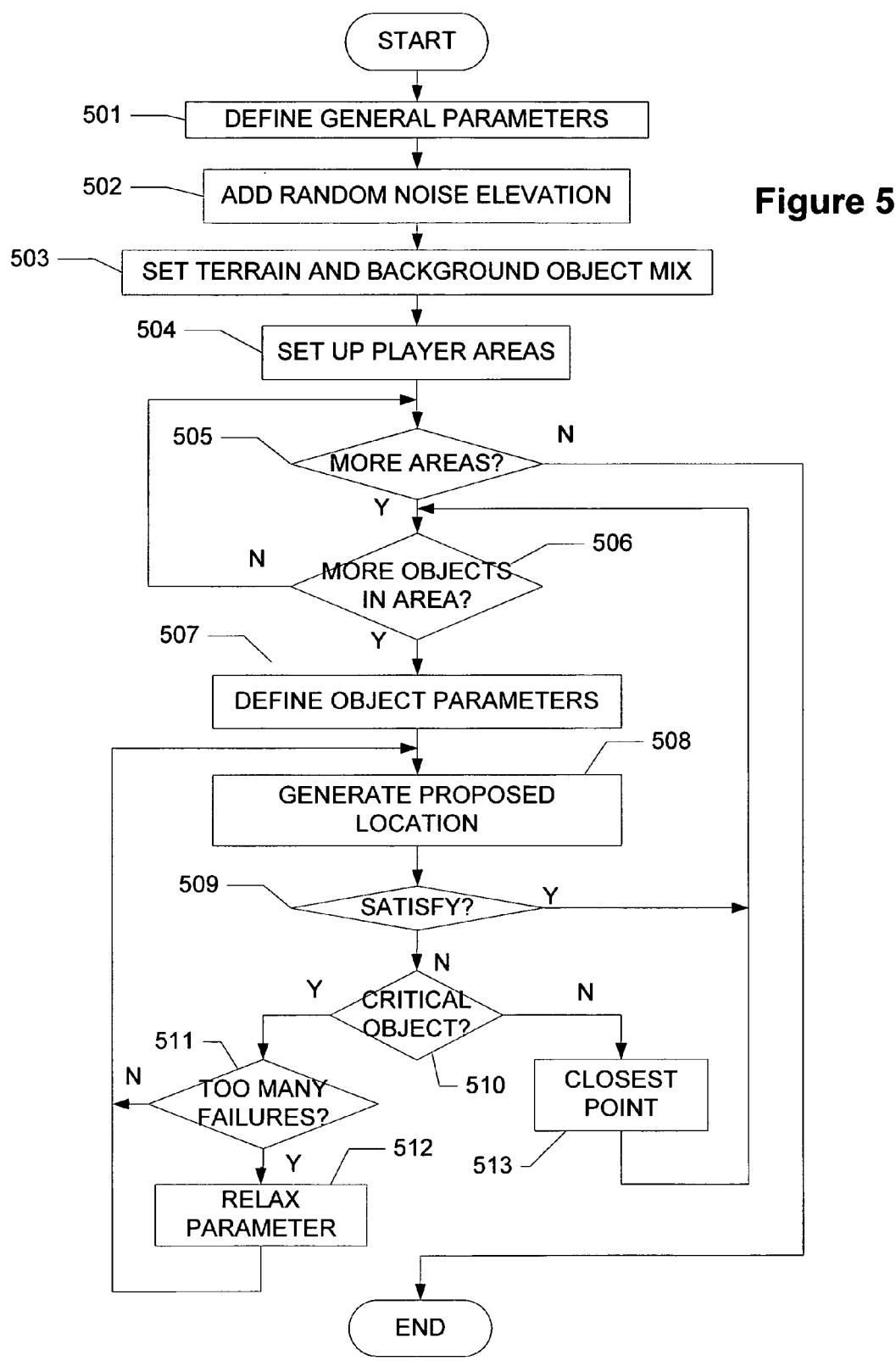
FIG. 5 illustrates an example random map generation process.

The various steps described above may be performed in any order. So, for example, although the random elevation in step 502 is shown before placing objects in step 508, this is for illustrative purposes, and the placement of objects may alternatively occur before, or simultaneously with, the random elevation. Similarly, although FIG. 5 illustrates an example in which all objects are placed in an area before considering the next area, the process may perform the steps in a different order, and may, for example, proceed in object order, placing objects across multiple areas.

The discussion above refers to various objects, both background and interactive, and several examples are given above (houses, farms, ponds, lakes, forests, trade routes used by neutral players, etc.). Additional objects are also possible. For example, some of the objects may be buildings or other structures, for example, for a neutral player. In some instances, it may be desirable to have groups of such objects, such as a small town, randomly appear. To this end, there may be groupings of objects that may be treated and placed as a single object in the map generation process. A grouping may be represented as a data structure identifying a plurality of object models and/or background object images, and their relative positional relationship to one another. For example, a grouping file may be an XML file that specifies two houses of type 'A' with a town center placed in between. A grouping of background objects may be represented as an image depicting the various individual objects, where the image is treated as a single background object during the map generation process.

To help smoothly integrate the grouping object with the surrounding terrain, the grouping object may include a texture mask. The mask may identify portions of the grouping object that are transparent (e.g., the spaces between buildings), so that when the grouping is placed on a terrain, the terrain's underlying texture can remain visible at the transparent portions. Other types of combinations are possible as well, in which the randomly-generated terrain and objects are combined with the grouping object.

Additionally, a grouping's terrain height may be adjusted to match (or approximate) the height at the randomly-determined location. To do so, the terrain heights at various points around a perimeter of the grouping may be averaged (e.g., the four cardinal directions), and adjusted by a corresponding average of the terrain heights at the terrain immediately surrounding the location of the grouping. So, for example, if the average perimeter terrain height of the grouping is 10 feet, and the grouping is being placed in an area having an average terrain height of 20 feet, the terrain height of the grouping may be increased by the difference to help present a better matched elevation.

Figure 6A:
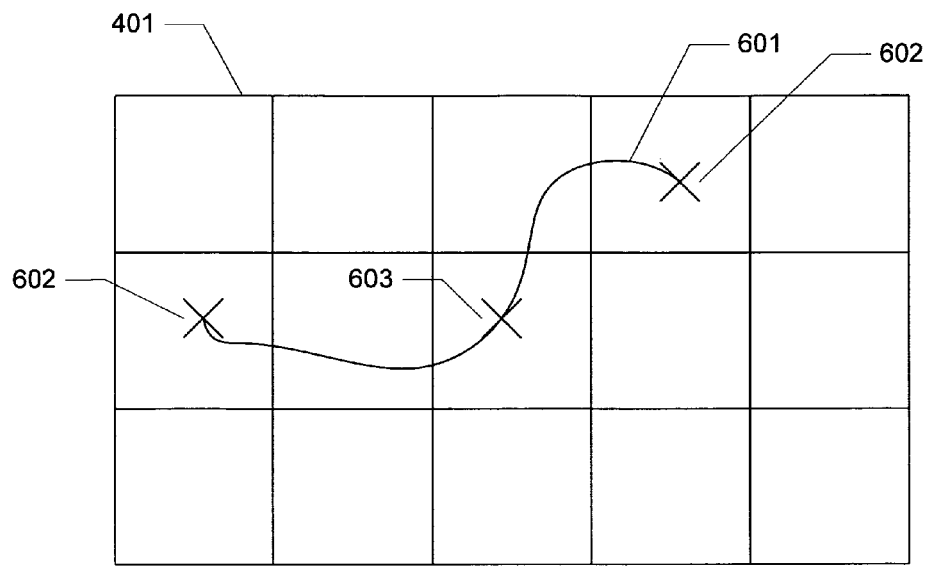
FIGS. 6a-b illustrate an example river object and movement direction.

Another possible object type is rivers. A river may be defined by a data structure, or data values contained in a script, by a smooth-line spline 601, as shown in FIG. 6*a*. The spline 601 may be defined by its two endpoints 602, and one or more intermediate waypoints 603. The data structure may further include data specifying other characteristics of the river, such as its width, depth, color, type of riverbank, speed, direction of water flow, etc., and the map generation system may place the river at the specified location having the specified qualities. The river may be a randomly-placed object. In such cases, the data structure may specify relative tile coordinates for the end- and waypoints of the spline, and the river may be automatically added at a randomly-generated location using this spline. The direction of movement may be used to control the movement of randomly spawn flotsam along the river path.

Figure 6B:
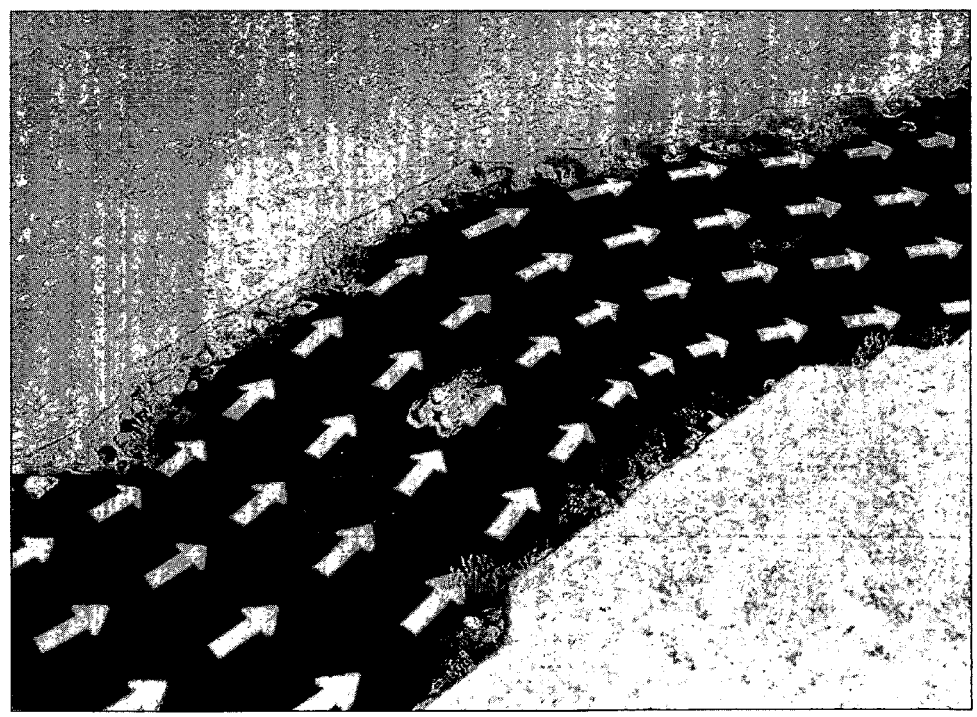

When a river spline is placed on a map, the spline may serve as the center of the river, and other textures in the river may be aligned with the spline. For example, the polygons for river textures may be provided with a reference to the river center at points along the river's path, and may be oriented such that they are aligned with or follow the river spline to present a more realistic looking river. The spline may also identify a direction in which river water moves, such as towards a first one of the endpoints 602, and movement of objects in the river may be directed parallel to this direction of movement. FIG. 6b illustrates examples of movement direction following the spline as the river spline bends. During game play, the game program may randomly spawn river debris, and cause that debris to move downstream along the spline.

Figure 7A:
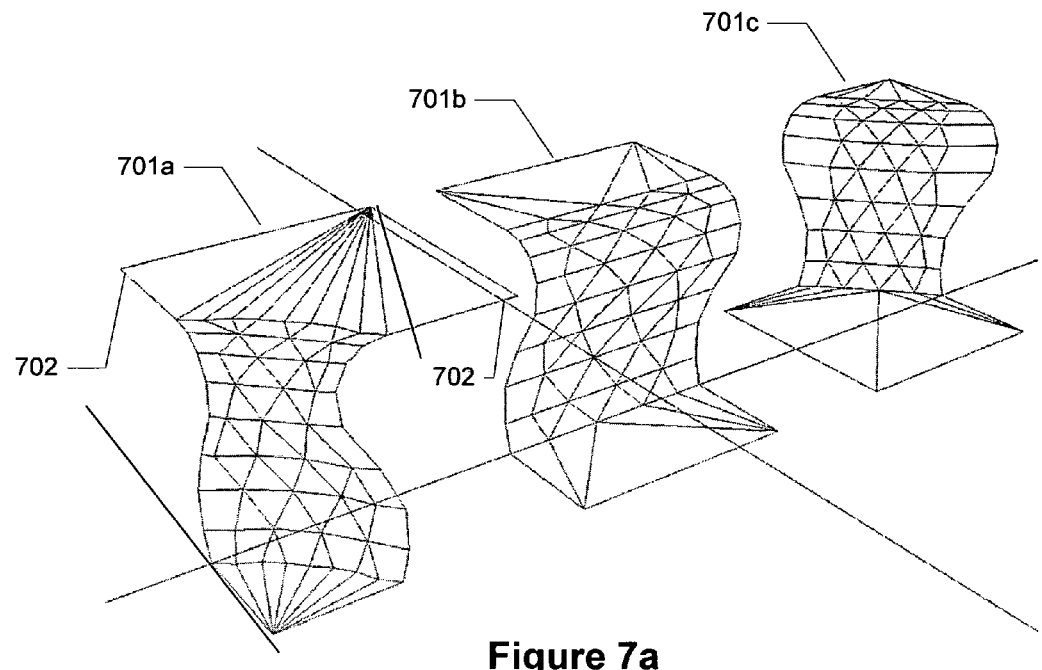
FIGS. 7a-b illustrate example cliff wire mesh objects.
Figure 7B:
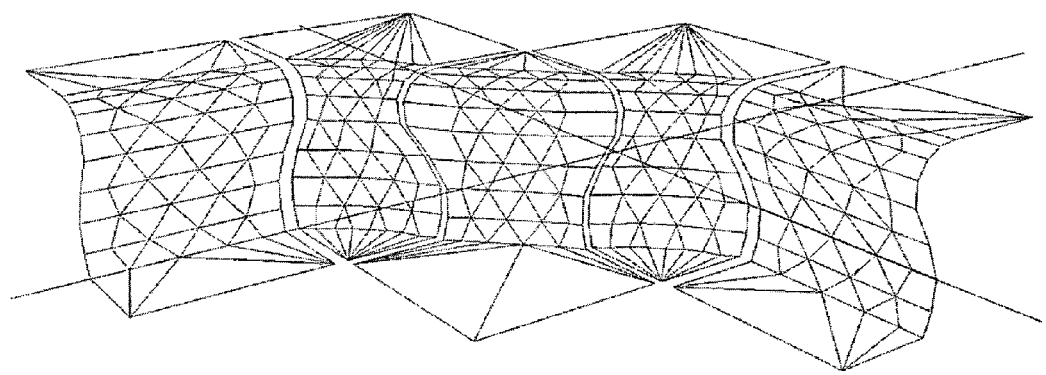

Another possible object is a cliff, where there may be a substantial change in elevation. Cliffs may be randomly added by including cliffs as a terrain type in initially defining the terrain. When the cliff areas are identified, an outline may be generated (e.g., by user predetermined line, randomly-generated spline, or other techniques) for the specific edge of the cliff. Other cliff features, such as gaps in the cliff edge, may be added as well to create "ramping" areas to the cliff. To support the random generation of cliffs, the game program may be provided with a number of predefined cliff meshes as objects that may replace one of the tiles 402. For example, FIG. 7a illustrates several example meshes 701a-c, created as three-dimensional polygonal models that, from an overhead view, each fit into a square tile 402. The models may be rotated along the four cardinal directions, such that a total of twelve different mesh types are available. If desired, more or fewer mesh types may be used. To add the cliff, the various cliff models may be rotated and fit together, as shown in FIG. 7b, with the edges of the models modified so that they join together smoothly by having common coordinates. Each cliff mesh may replace one terrain tile in the grid 401, and additional textures, such as diffuse maps, normal maps and displacement maps, may be applied to the cliff using tileable textures. In some implementations, the various meshes may each be provided with an equal (or substantially equal, e.g., within a predetermined difference limit) texture density, so that further operations such as displacement mapping, diffuse mapping, normal mapping, etc. may be consistently applied.

Figure 8A:
Figure 8B:
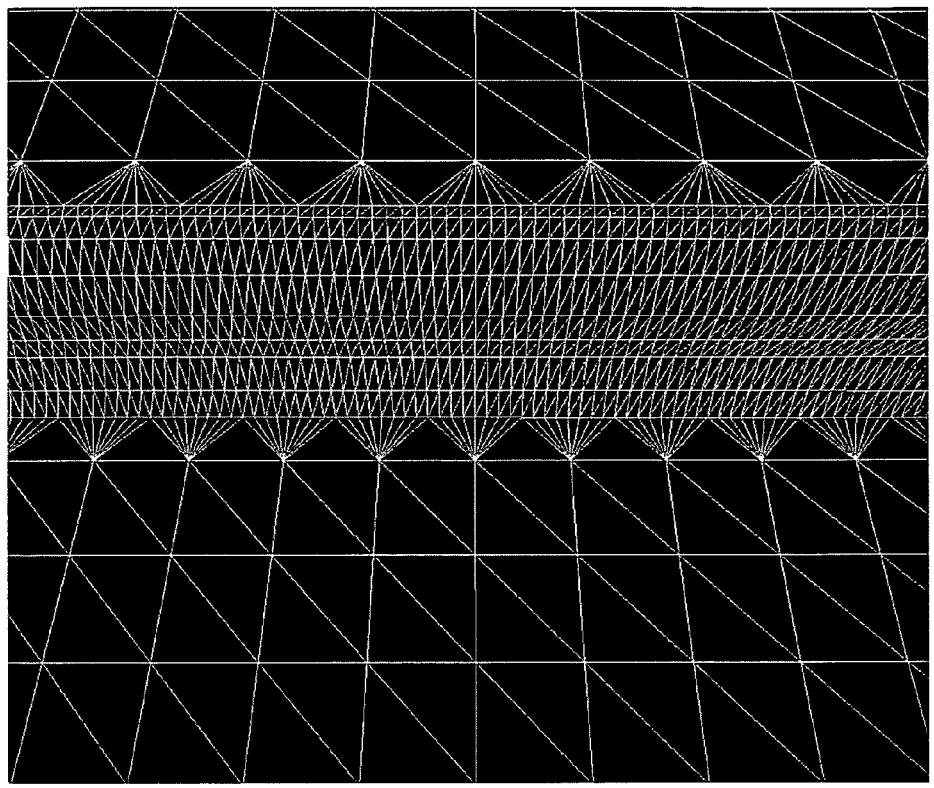
FIGS. 8b-c illustrate examples of application of the displacement map to a sample cliff.
Figure 8C:
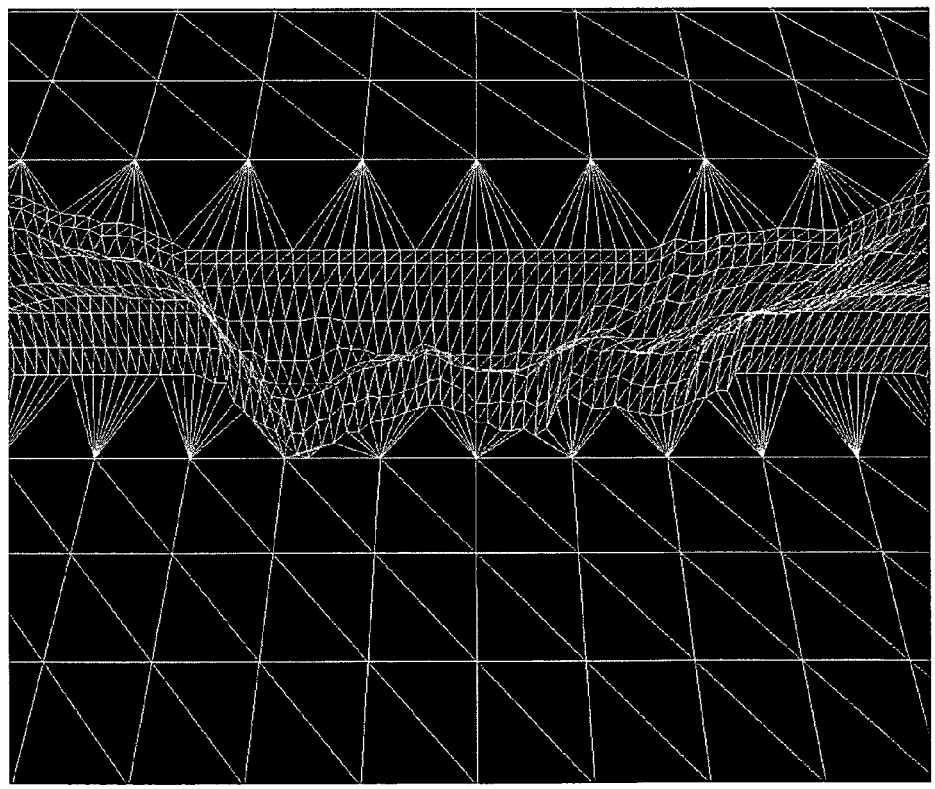

FIG. 8a illustrates an example of a displacement map that may be generated in advance by a user or designer of the cliff. The displacement map may store data values for a variety of tiles, as represented by different color densities in the map, and when applied to a cliff mesh surface as a texture, the various points or vertices on the surface of the mesh may be adjusted (or displaced) in position by an amount based on the value at that position in the displacement map. For example, dark texels may cause a point or vertex to move backwards, while a light texel may cause the point or vertex to move forwards. FIGS. 8b and 8c illustrate examples of how the displacement map in FIG. 8a may modify a cliff. Any known displacement mapping technique may be used, and any desired displacement map may be used.

Since the terrain underneath a cliff might not be perfectly flat (e.g., in view of the noise elevation in FIG. 5), the upper surface of the added cliff may also have its elevations adjusted to correspond to the elevation at the base of the cliff. As one approach to doing so, when adding a cliff mesh to replace a tile, the system may consider the elevation at the four corners 702 of the tile being replaced, and assign four weight values to each vertex in the mesh based on the vertex's proximity to the four corners. These four weights may be multiplied by the four corner elevations, respectively, and the vertex elevation may be modified by the average of these four weighted values. So, for example, the elevation of each vertex in the cliff mesh may be calculated as:

New VertexElevation=Old_Vertex_Elevation+((DistanceCornerA)*(ElevationCornerA) + (DistanceCornerB*ElevationCornerB)+ (DistanceCornerC*ElevationCornerC)+ (DistanceCornerD*ElevationCornerD))/4

The "DistanceCorner_" values may be normalized or scaled values of the distance between the vertex and the corner. Additionally, when adding a cliff, elevation values of other tiles on the map may be adjusted to reflect the change in elevation. For example, tiles above the cliff may have their elevations increased by the height of the cliff.

Another possible object may be the objects that belong to a neutral player. One or more players in the game may be treated as neutral, and may be initially under the control of the game program. The neutral player may have the same objects (e.g., villagers, buildings, etc.) as the other players, but may begin the game friendly to all other players, and without a goal of attacking other players. The neutral player may, however, be provided with one or more alliance conditions, and may become allied with one or more of the players during the course of the game if those players satisfy the neutral player's alliance condition(s). For example, a neutral player may be provided with a location on which another player may build a structure, such as a trading post. When a player successfully builds a trading post at a neutral player's location, the neutral player may become allied with that player, and may begin operating to assist the player in achieving the game's victory condition. For example, the computer artificial intelligence may begin to construct military units and attack units of the allied player's enemies.

The neutral player's alliance may change during the course of the game as well. So, for example, if a first player satisfies the neutral player's alliance condition(s), but a second player subsequently satisfies those same conditions, the neutral player may switch allegiance to the second player. So, to continue the trading post example above, if a second player subsequently destroys the first player's trading post, and builds her own trading post at the neutral player's location, the neutral player may switch allegiances to the second player, and may actually begin attacking the first player, with whom the neutral player had previously been allied.

From the description above, a random map may be generated to allow one or more players to repeatedly play the game with different scenarios and/or maps. During the course of the game play, the players may generate large numbers of controllable characters. For example, one player might have an army of 30 soldiers of varying types (musketeers, cavalry, cannons, etc.), another player may have an army of 20 soldiers of different types (different nationality footmen, axemen, etc.), and yet another player may have even more units. If implemented in an RTS, the presence of this many characters onscreen (e.g., in a single battle) may place heavy processing requirements on the computing device running the game, particularly if the characters are to be realistically animated to reflect movement, battle, reaction to injury, etc.

Figure 9:
FIG. 9 illustrates a humanoid form.
Figure 10:
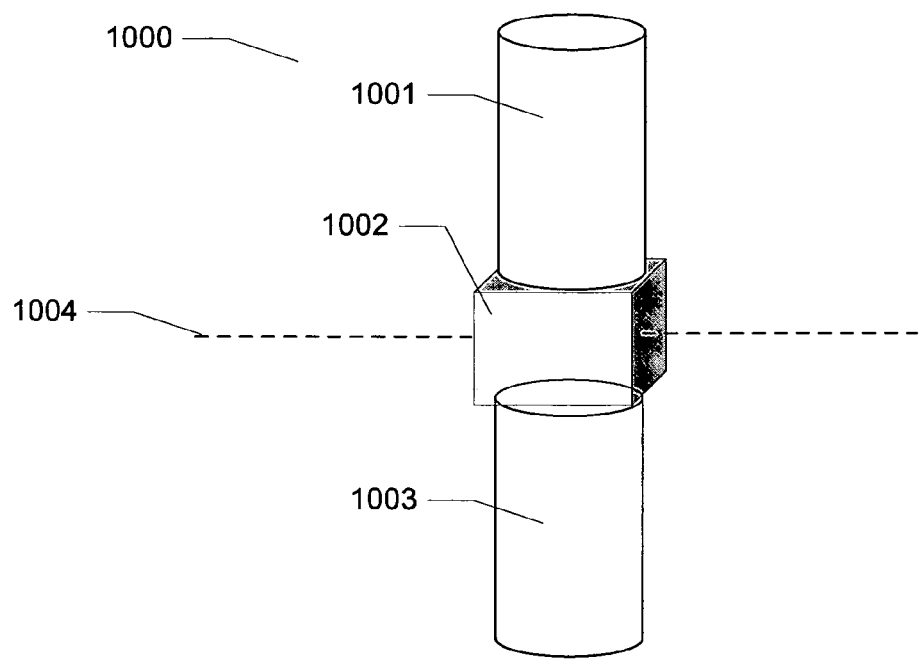
FIG. 10 illustrates a model having three components.

To help simplify the processing requirements and yet still provide realistic physics in modeling the characters, a clamshell humanoid model may be adopted. FIG. 9 illustrates an example model of a humanoid figure, and FIG. 10 illustrates a three-piece model 1000 for simulating humanoid movement. The model may include a first cylinder 1001, a center block 1002, and a second cylinder 1003. The movement of these objects may be constrained by two movement constraints: such as a hinge constraint at the juncture between the first cylinder 1001 and block 1002, and a second hinge constraint at the juncture between block 1002 and the second cylinder 1003. The constraints may keep the cylinders within a predetermined distance of the block 1002, and may restrict movement of the cylinders to a rotation about the central axis 1004 of the block. Use of cylinders and blocks (or squares) for the shapes helps present realistic physical interactions when the model collides with other modeled objects on the map, but other shapes may be used as well.

Figure 11:
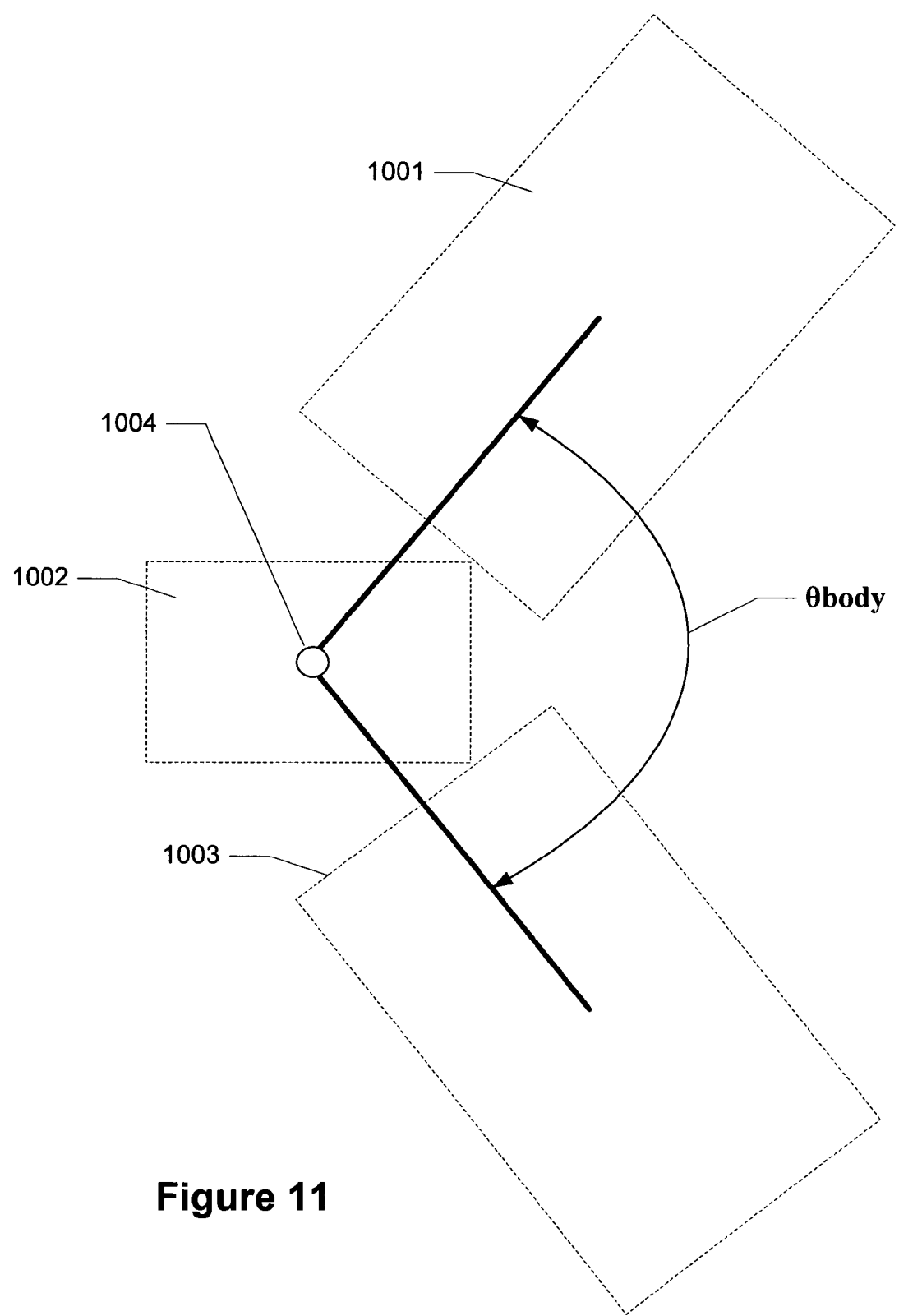
FIG. 11 illustrates a side view of the model in FIG. 13, with a bend.

FIG. 11 illustrates a side view of the model 1000 with this rotational movement shown. The two cylinders 1001, 1003 are permitted to rotate about axis 1004, and form an angle ($\theta$Body). The model 1000 may be provided with a minimum value for this angle, and a maximum value for this angle, to reflect the possible range of motion for the model. For example, the range of motion may be from a maximum of 180° (e.g., character standing upright) to a minimum of 30° (e.g., character doubled over).

Figure 12:
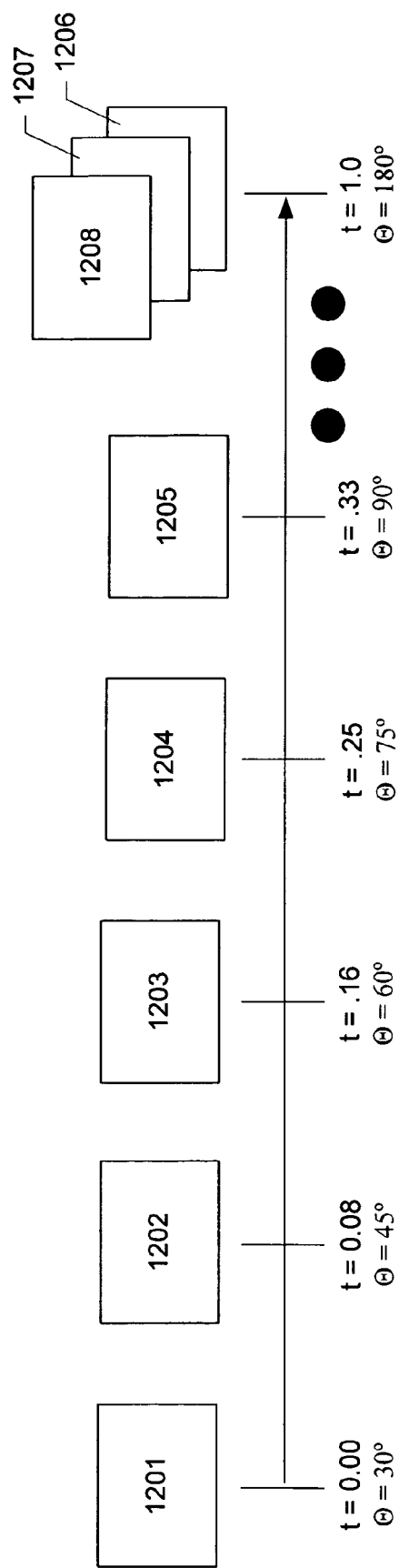
FIG. 12 illustrates an example timeline of animation frames associated with angles.

An animation may be predefined for the model, showing different animation appearances (e.g., one or more frames per angle) at various angles. Typical animation techniques display different frames of images based on the passage of time (e.g., displaying a new frame every $\frac{1}{30}^{th}$ of a second). FIG. 12 illustrates an example timeline for an animation that progresses depending on the angle, as opposed to the passage of time. So, for example, when the angle is at its minimum value of 30°, the animation may show frame 1201, and may continue to do so as long as the angle remains 30°. When the angle is at 45°, the animation may show frame 1202, and so on until the maximum angle is reached. If the animation were represented as time values from 0.0 to 1.0, and the model smoothly bent over from minimum to maximum angle, the corresponding time values would be ($\theta$Body−$\theta$Min)/($\theta$Max−$\theta$Min)). In this manner, an animation may be driven not necessarily by the straight passage of time, but by the angle of the body. Accordingly, a physical simulation of movement of the body, applying its movement constraints, can cause a corresponding animation appearance.

Modifications to the above may be made. For example, there may be multiple animations, or multiple frames, associated with each angle. For example, FIG. 12 illustrates multiple frames 1206-8 associated with the maximum angle. If the physical model were to remain at that angle, the display may sequentially show frames 1206-8 as an animation, where frames 1206-8 may be separated by their own time-based frame rate (e.g., at $\frac{1}{30}^{th}$ of a second, or some other time rate). Such additional animations may be added at various points, to present additional details, such as one animation for the flailing of a limb and another animation for the visible damage to a limb that may appear at a given angular position. As another example, FIG. 12 illustrates different frames every 15°, but different frames may be used for any angular difference desired. Furthermore, the angles referred to herein need not be singular numbers, but may be ranges (e.g., 45° may refer to a range around 45°, such as 40° to 50°).

Figure 13:
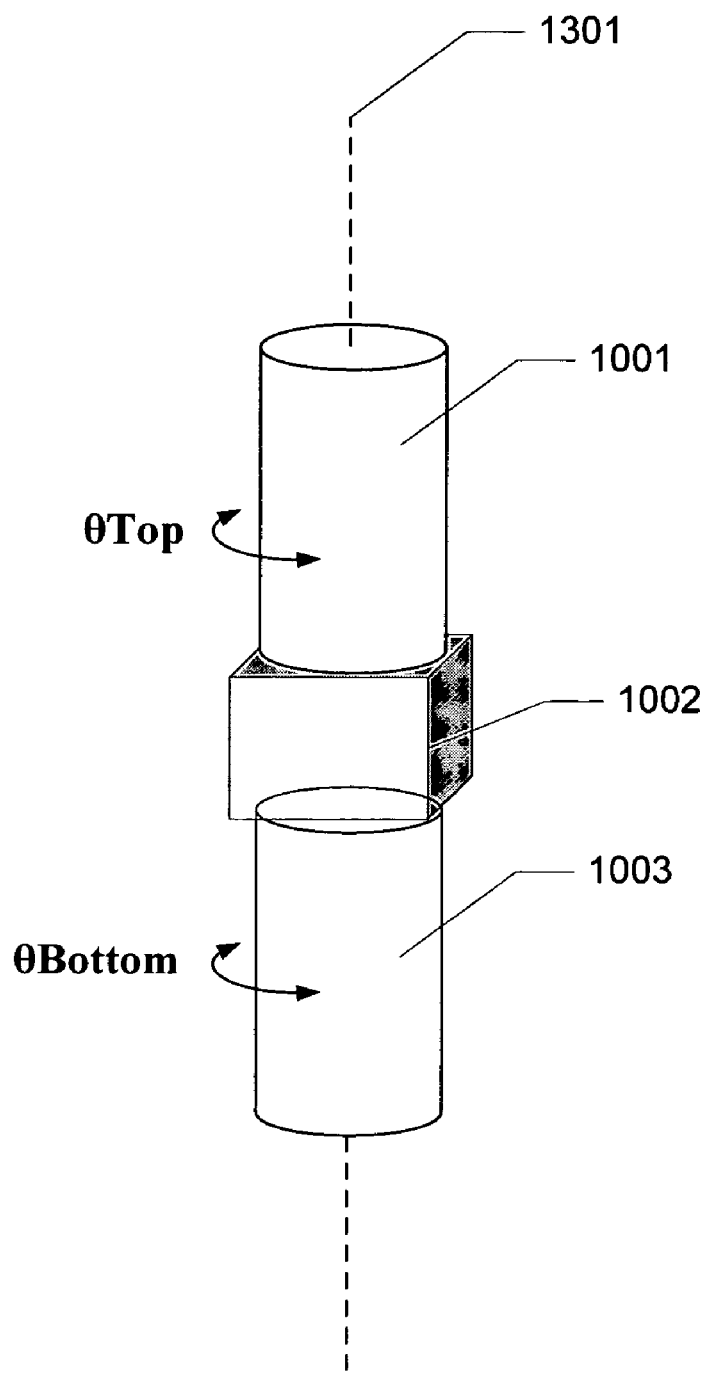
FIG. 13 illustrates example twisting angles.

Additionally, the axis 1004 need not be the only axis of movement. FIG. 13 illustrates how the model may also be permitted to twist the cylinders 1001, 1003 with respect to the center block 1002 along a vertical axis 1301, resulting in an angle ($\theta$Top) for the first cylinder 1001 and an angle ($\theta$Bottom) for the second cylinder 1003, and those angles may also have their own separate angle-based animations. Furthermore, other angles may be used as well, such as an angle formed by a single cylinder with respect to a vertical, horizontal, or some other plane of the modeled object.

As another option, different shapes other than cylinders may be used for the body portions. Spheres, a flattened cylinder, cubes, an ovoid egg-shape, or other shapes may be used as well, each with different physical modeling characteristics. Additionally, different angular ranges may be used for the animation. For example, instead of ranging from 30° to 180°, other angular ranges, such as 75° to 225°, could be used. The animation may also progress in a reverse direction from the example shown in FIG. 12. In other words, FIG. 12 illustrates an example animation going from 30° to 180° as time goes from 0.0 to 1.0. As an alternative, the animation may progress in a reverse direction, where 180° maps to time=0.0, and 30° maps to time=1.0.

By using these physical models, humanoid characters can be relatively realistically simulated while avoiding excessive processing requirements. For example, one set of animations may be generated for a humanoid character that is thrown down a hill by an explosion. The physical model may be used to simulate the physical bouncing and body behavior as the unfortunate character tumbles, and the angle of the model components may be used to determine what animation appearance to show (e.g., the character in various stages of distress).

The features described above are preferably encoded in computer software as executable instructions that can be executed on a computing device, such as a personal computer or video game console, to result in the display of the screens shown in the figures. The executable instructions may be stored on a computer-readable medium, such as one or more computer disks, RAMs, CD-ROMs, DVDs, game cartridges, etc. Also, although various features are described above, it is not necessary to practice them all in the same embodiment. Instead, various combinations and subcombinations may be implemented as desired, and the true scope of the present invention should only be limited by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. A computer-implemented method of generating a random map at a computing system having a processor and memory, comprising the steps of the computing system performing the following:

the computing system defining a plurality of elements to be distributed across a plurality of tiles on a map to be generated;

the computing system assigning a plurality of weight values to said plurality of elements;

the computing system using a random value function to generate a value for each of said plurality of tiles;

the computing system comparing said generated value with one or more of said assigned weight values to select one of said elements for one of said tiles; and the computing system adding said selected element, comprising a first object, to said one of said tiles in the map by at least performing the following:

defining one or more placement constraints for a first object to be placed on a the map, said constraints identifying an object type, and indicating a distance value to be used in placing said first object if another object of said identified object type is already placed on said map;

proposing a location on said map for said first object;

determining whether said proposed location satisfies said one or more constraints; and if said proposed location does not satisfy said constraints, then finding a second location on said map for said first object, wherein said second location is found based on said proposed location.

2. The method of claim 1, wherein said elements comprise terrain textures.

3. The method of claim 1, wherein said elements comprise object models.

4. The method of claim 3, further comprising steps of: assigning a weight value to the absence of an object model; and determining that a second one of said tiles will have no object model based on comparing a value generated for said second one of said tiles with said weight value assigned to the absence of said object model.

5. The method of claim 3, further comprising the step of rotating said selected object model when adding said selected object model to said one of said tiles, and rotating said selected object model by a different amount when adding said object model to another tile.

6. The method of claim 1, further comprising the steps of:
receiving a user identification of at least one parameter for the generation of said map; and accessing a mix file containing corresponding parameters for said random value function.

7. The method of claim 6, wherein said mix file also includes the random value function.

8. The method of claim 7, wherein said random value function comprises a Perlin noise function.

9. The method of claim 1, wherein said elements comprise terrain textures, and further comprising the step of:
further using said generated value and a weighted list of object models to determine whether an object model should be placed in said one of said tiles.

10. The method of claim 1, further comprising the step of adding a river to said map as a spline.

11. The method of claim 1, further comprising the step of adding a cliff to said map using a plurality of selectable, rotatable, cliff meshes.

12. The method of claim 11, further comprising the step of adjusting vertex elevations of said cliff meshes based on elevations of neighboring tiles to said added cliff.

13. The method of claim 1, further comprising the step of adding noise elevation to said map using a second random value function.

14. The method of claim 1, further comprising the steps of:
determining a number of objects to be placed on said map based on a number of players;

defining separate player areas of said map for each player; and distributing said objects into said areas.

15. The method of claim 1, wherein if said second location also fails to satisfy said constraints, and a predetermined number of additional failed proposed locations are identified, then skipping placement of said first object on said map.

16. The method of claim 1, further comprising the steps of:
defining one or more placement constraints for a second object to be placed on said map, said constraints identifying an object type for said second object, and indicating a distance value to be used in placing said second object if another object of said identified object type for said second object is already placed on said map;

proposing a location on said map for said second object;

determining whether said proposed location satisfies said one or more constraints; and if said proposed location does not satisfy said constraints, then identifying a priority of said second object, and if said second object is of a priority higher than a predetermined threshold priority, relaxing said one or more placement constraints for said second object.

17. One or more computer-readable storage media, storing the following:
a script file defining a plurality of elements to be distributed across a plurality of tiles on a map to be generated, wherein said file identifies a plurality of weight values to said plurality of elements, and wherein said media also stores computer-executable instructions for performing the method recited in claim 1.

18. The one or more media of claim 17, wherein said elements include terrain textures and objects.

19. The one or more media of claim 17, further including computer-executable instructions for relaxing a placement restriction in response to a predetermined number of failed attempts at placing an object using an original placement restriction.

20. The one or more media of claim 17, further including computer-executable instructions for randomly placing a river on said map using a spline, and for aligning river textures for said river with said spline.

21. The method of claim 1, wherein each of the plurality of elements is assigned a different weight.

* * * * *